Oct. 16, 1951 M. MENNESSON 2,571,917
OPPOSED CONTACT GAUGE AND GUIDES
Filed Jan. 21, 1948 2 SHEETS—SHEET 1
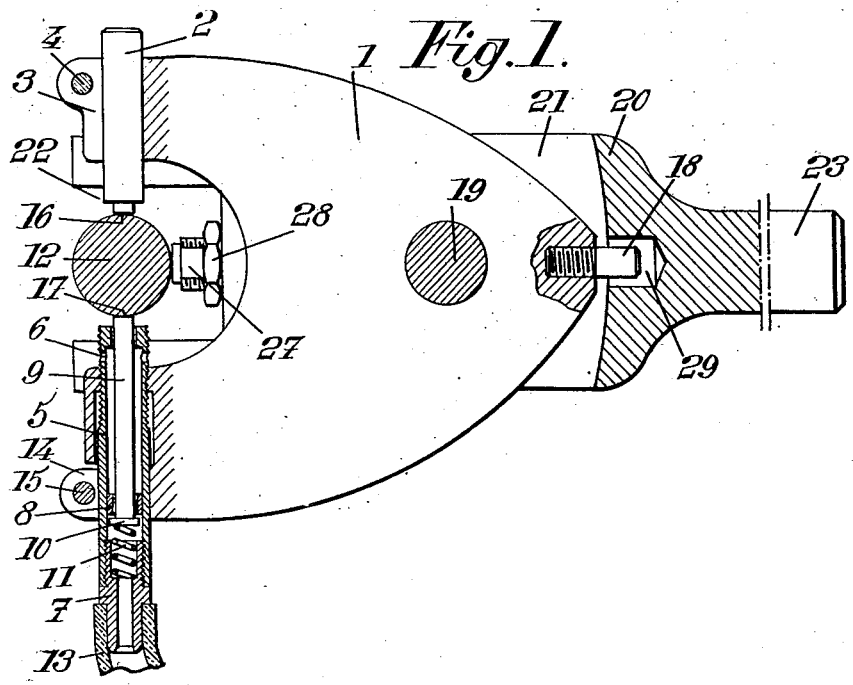
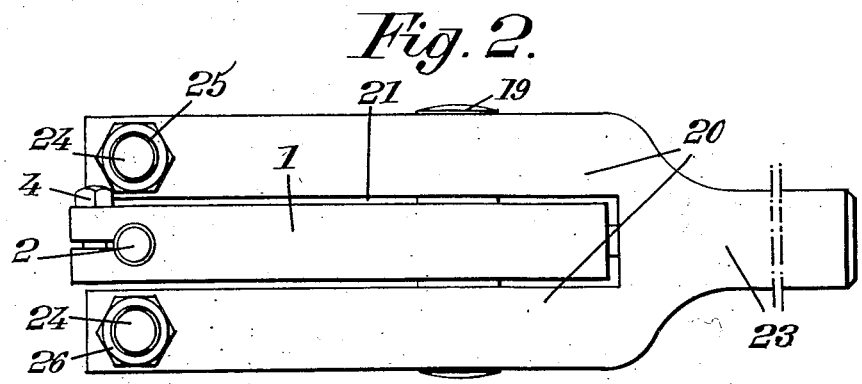
INVENTOR
MARCEL MENNESSON
BY
ATTORNEYS Oct. 16, 1951 M. MENNESSON 2,571,917
OPPOSED CONTACT GAUGE AND GUIDES
Filed Jan. 21, 1948 2 SHEETS—SHEET 2
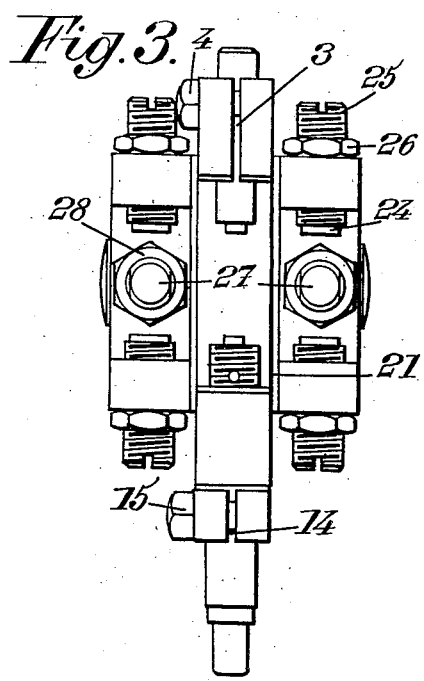
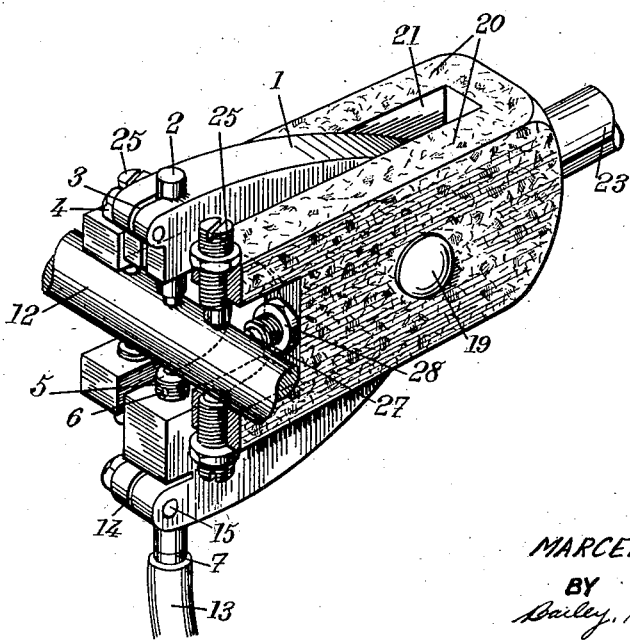
INVENTOR
MARCEL MENNESSON
BY
Bailey, Stephens & Huettig
ATTORNEYS Patented Oct. 16, 1951

2,571,917

UNITED STATES PATENT OFFICE 2,571,917

OPPOSED CONTACT GAUGE AND GUIDES

Marcel Mennesson, Neuilly-sur-Seine, France, assignor to Societe Anonyme de Construction de Materiel Automobile (S. A. C. M. A.), Neuilly-sur-Seine, France, a society of France Application January 21, 1948, Serial No. 3,497
In France May 14, 1947

6 Claims. (Cl. 33—143)

The present invention relates to amplification devices for measuring or checking the dimensions of a piece and of the kind including a support carrying a fixed but adjustable contact member and a movable contact member, belonging to a pneumatic, mechanical, electrical or other, amplifier, in particular for measuring or checking diameters or thicknesses.

The chief object of my invention is to provide a device of this kind which ensures a correct relative positioning of the measuring device and of the piece to be measured in order automatically to apply the contact members of the measuring device in the desired position with respect to said piece.

Preferred embodiments of my invention will be hereinafter described with reference to the accompanying drawings, given merely by way of example and in which:

Figs. 1 to 3 show, in longitudinal section, in plan view and in end view, respectively, a measurement device made according to the invention.

Fig. 4 is a perspective view, with parts cut away, of said device.

The device shown by the drawings includes a support 1, for instance C-shaped, one branch of which carries, at its free end, a fixed contact member 2, extending toward the other branch of the C and the axial position of which can be adjusted by sliding it in a housing, and which can be fixed, after adjustment, through any suitable means, for instance by providing in the wall of its housing a longitudinal slot 3 the edges of which can be brought together by means of a tightening screw 4.

Opposite fixed contact member 2, I fit, on the other branch of support 1, an amplifier the body 5 of which is screwthreaded at 6 to permit of accurately adjusting the axial position of said body with respect to support 1 and, consequently, its interval with respect to fixed contact member 2. In the example shown in the drawing it has been supposed that the axes of contact member 2 and body 5 coincide but this is not essential for amplifier 5 might be more or less displaced frontwardly, rearwardly or laterally with respect to fixed contact 2.

In the example shown it has been admitted that the amplification of the measurement obtained by means of the C-shaped support is obtained through pneumatic means. I might quite as well make use of mechanical, electrical or other amplifying means. In the case of pneumatic amplification, the body 5 of the amplifier is constituted by a tubular piece the rear end of which carries a connection 7. Inside this piece is provided a valve seat 8 and a valve stem 9 carrying a valve 10, stem 9 forming the movable contact member of the measurement device.

A spring 11 tends permanently to apply movable contact member 9 against the piece to be measured. Connection 7 communicates with a source of compressed air and with a pressure gauge (not shown) through a flexible tube 13. The amplifier body 5 can be secured in position in its housing, after adjustment, by means of a slot 14, provided longitudinally in said housing, and of a tightening screw 15.

The work contacting ends of fixed contact member 2 and movable contact member 9 preferably include small flat surfaces 16 and 17, respectively.

I provide, at a point of the support 1 of contact members 2 and 9, a finger 18 the function of which will be hereinafter indicated.

Support 1 is freely engaged on a transverse pivot 19 which extends therethrough at a suitably chosen point so that it can oscillate about this pivot 19 and that, under the effect of its own weight, support 1 is urged downwardly so as to apply the end 16 of fixed contact member 2 against the piece 12 to be measured.

The whole of the C-shaped frame is mounted in a guiding device 20 including two parallel branches leaving between them an interval 21 in which the body 1 of the C can move freely, these branches being provided with corresponding holes through which the pivot 19 of body 1 is held through suitable means. In the end of each of the branches I provide an aperture 22, for instance of rectangular shape, into which the piece 12 to be measured can be introduced so as to interpose it between contact members 2 and 9 the work contacting ends 16 and 17 of which project from planes passing through the corresponding horizontal edges of these apertures 22.

Guide 20 may include, if necessary, a handle 23 which permits of grasping it to engage the C-shaped frame on piece 12 or of fixing the whole on or in a support. On the horizontal edges of apertures 22 are provided adjustable guiding abutments 24 extending substantially parallel to the plane of oscillation of support 1 and adjustable by means of screws 25 while adapted to be fixed in position by lock nuts 26. The ends of these abutments, intended to come into contact with piece 12, are advantageously made of a hard material, for instance tungsten carbide, in order to avoid wear and tear. In the example shown by the drawing, I make use of four of these abutments 24 to obtain perpendicularity between the axes of contact members 2 and 9 and the axis of the piece 12 to be measured.

Other abutments 27, also adjustable and provided with lock nuts 28, are provided on the vertical edges of apertures 22 so as to position pieces 12 longitudinally in order to have the axes of contact members 2 and 9 passing through the axis of the piece 12 to be measured when this piece is cylindrical.

At the bottom of the interval 21 between branches 20, I provide a notch 29 in which can be housed finger 18 and the dimensions of which are such, with respect to those of finger 18, that the whole of the C-shaped frame can oscillate freely about pivot 19 with a limited amplitude.

If it is desired, for instance, to proceed to the measurement or checking of a cylindrical piece, I proceed in the following manner:

First I adjust abutments 24 at a distance from each other slightly greater than the dimensions of the piece to be measured, for instance one tenth of a millimeter, then I adjust by means of abutments 27 the approximate position of said piece so that the axes of contact members 2 and 9, or at least that of contact member 9, pass through the axis of said piece. The precision of these adjustments is not absolute. As a matter of fact, flat surfaces 16 and 17 permit slight variations in the depth adjustment without the measurement suffering therefrom. Fixed contact member 2 and movable contact member 9, which belong to the amplifier, are then adjusted in such manner that their positions are adapted to the dimensions of the piece 12 to be measured.

When piece 12 is inserted between abutments 24, it lifts the end 16 of fixed contact member 2 and movable contact member 9 comes into contact with the diametrically opposed portion of this piece 12, which more or less opens valve 10, according to the dimensions of piece 12, thus modifying the rate of flow of the compressed air stream supplied through tube 13. The variations of output of this air stream are then indicated or recorded in the usual manner, by the pressure gauge of the pneumatic amplifier.

According to my invention, I may combine several guiding pieces, such as 20, together so that they can act as a support for at least one articulation axis about which can oscillate several supports such as 1, carrying measurement contact members, in order to make it possible simultaneously to perform several measurements on the same piece.

In a general manner, while I have, in the above description, disclosed what I deem to be practical and efficient embodiment of my invention, it should be well understood that I do not wish to be limited thereto as there might be changes made in the arrangement, disposition and form of the parts without departing from the principle of the present invention as comprehended within the scope of the accompanying claims.

What I claim is:

1. A device for measuring or checking the dimensions of a piece of work which comprises, in combination, a guide member supported independently of said piece of work, at least two guiding abutments for said piece of work carried by said guide member opposite each other at a distance from each other a little greater than the corresponding dimension of said piece of work so that said piece can pass with a slight play between them, a C-shaped support movably interconnected with said guide member to permit small relative displacements of the C-shaped support branches in a direction at least substantially parallel to a line joining the work engaging faces of said two guiding abutments, a contact member carried by one branch of said C-shaped support in fixed position thereon, a contact member carried opposite said fixed contact member by the other branch of said C-shaped support movably with respect thereto in the above mentioned direction, and means for measuring relative displacements of said movable contact member with respect to said C-shaped support.

2. A device for measuring or checking the dimensions of a piece of work which comprises, in combination, a guide member supported independently of said piece of work, at least two guiding abutments for said piece of work carried by said guide member opposite each other at a distance from each other a little greater than the corresponding dimension of said piece of work so that said piece can pass with a slight play between them, a C-shaped support pivoted to said guide member about an axis at right angles to a line joining the work engaging faces of said two guiding abutments, a contact member carried by one branch of said C-shaped support in fixed position thereon, a contact member carried opposite said fixed contact member by the other branch of said C-shaped support movably with respect thereto in a direction parallel to the above mentioned line, and means for measuring relative displacements of said movable contact member with respect to said C-shaped support.

3. A device for measuring or checking the dimensions of a piece of work which comprises, in combination, a guide member supported independently of said piece of work including two parallel flat portions, a pair of opposite guiding abutments for said piece of work carried by each of said guide member portions at a distance from each other a little greater than the corresponding dimension of said piece of work so that said piece can pass with a slight play between the guiding abutments of each pair, a flat C-shaped support between said two guide member portions pivoted thereto about an axis at right angles to a line joining the work engaging faces of the two guiding abutments of each pair, a contact member carried by one branch of said C-shaped support in fixed position thereon, a contact member carried opposite said fixed contact member by the other branch of said C-shaped support movably with respect thereto in a direction parallel to the above mentioned line, and means for measuring relative displacements of said movable contact member with respect to said C-shaped support.

4. A device according to claim 1 in which said guiding abutments are adjustable on said guide member.

5. A device according to claim 3 in which said flat portions of the guiding support are provided with apertures to receive the piece of work, further including adjustable abutments carried by the inner portions of the apertures to cooperate with the piece of work.

6. A device according to claim 2 further including means for limiting to a small amplitude the relative pivoting displacements of said support and said guide member.

MARCEL MENNESSON.

REFERENCES CITED

The following references are of record in the file of this patent:

UNITED STATES PATENTS

| Number | Name | Date |
|---|---|---|
| 1,049,860 | Hirth | Jan. 7, 1913 |
| 1,617,284 | Ames | Feb. 8, 1927 |
| 1,635,908 | Stuart | July 12, 1927 |
| 1,818,968 | Anderson | Aug. 18, 1931 |
| 2,358,264 | Taylor | Sept. 12, 1944 |

FOREIGN PATENTS

| Number | Country | Date |
|---|---|---|
| 601,908 | Great Britain | May 14, 1948 |
| 647,674 | Germany | July 9, 1937 |